US007365262B2

(12) United States Patent
Hayakawa

(10) Patent No.: US 7,365,262 B2
(45) Date of Patent: Apr. 29, 2008

(54) ELECTRONIC MUSICAL APPARATUS FOR TRANSPOSING MUSICAL PIECE

(75) Inventor: Tokuji Hayakawa, Hamamatsu (JP)

(73) Assignee: Yamaha Corporation (JP)

( * ) Notice: Subject to any disclaimer, the term of this patent is extended or adjusted under 35 U.S.C. 154(b) by 355 days.

(21) Appl. No.: 11/185,643

(22) Filed: Jul. 20, 2005

(65) Prior Publication Data

US 2006/0016323 A1 Jan. 26, 2006

(30) Foreign Application Priority Data

Jul. 21, 2004 (JP) ............................ 2004-213462

(51) Int. Cl.
*G10H 7/00* (2006.01)
*H02M 5/00* (2006.01)

(52) U.S. Cl. ........................................................ 84/619

(58) Field of Classification Search .................. 84/619, 84/657

See application file for complete search history.

(56) References Cited

U.S. PATENT DOCUMENTS 5,561,256 A * 10/1996 Aoki et al. ................... 84/619
5,864,079 A * 1/1999 Matsuda ...................... 84/619

FOREIGN PATENT DOCUMENTS

JP 09-292889 A 11/1997

* cited by examiner

*Primary Examiner*—Jeffrey Donels
(74) *Attorney, Agent, or Firm*—Rossi, Kimms & McDowell LLP

(57) ABSTRACT

Plural pieces of music data (performance data) each corresponding to each of plural music pieces are stored in a rewritable external storage device 25. Further, tone range restriction data indicating a sound generable range of a tone is stored in the external storage device 25 as associated with each piece of performance data or each piece of tone color data for controlling a tone color of a tone. A CPU 21 transposes the music piece corresponding to the selected performance data by the inputted transposition amount by the program process. In case where a part of the pitch of the transposed music piece is outside the sound generable range indicated by tone range restriction data corresponding to the selected performance data or to the selected tone color data, the transposition amount of all of or a part of the music piece including at least a note corresponding to the aforesaid part of the pitch is changed. Accordingly, a sound generable range is changed depending upon a music piece or according to a taste of a user even if a tone is generated with a same tone color.

23 Claims, 9 Drawing Sheets

ELECTRONIC MUSICAL APPARATUS FOR TRANSPOSING MUSICAL PIECE

BACKGROUND OF THE INVENTION

1. Field of the Invention

The present invention relates to an electronic musical apparatus that can transpose all of or a part of a music piece indicated by performance data.

2. Description of the Related Art

There has conventionally been known a karaoke apparatus or automatic performance apparatus wherein a music piece to be performed is transposed to obtain a key by which a user is easy to sing a song or a user is easy to play. In this type of apparatuses, as shown in Japanese Unexamined Patent Application No. HEI9-292889, tone range restriction data (for example, pitch information of the upper limit or lower limit in a sound generable range) that represents a sound generable range of a tone is stored for every tone color of a musical instrument, wherein, in case where a pitch of any one of notes in the transposed music piece is outside the sound generable range represented by the tone range restriction data, pitches corresponding to all notes in the phrase are uniformly shifted such that all notes in the phrase including the note whose pitch is outside the sound generable range are placed in the sound generable range.

However, in the above-mentioned conventional apparatuses, a sound generable range of a tone is unambiguously determined for every tone color of a musical instrument, so that it is impossible to change the sound generable range depending upon a music piece or to change the sound generable range according to a taste of a user, even in case where a tone is generated with the same tone color.

SUMMARY OF THE INVENTION

The present invention is accomplished for solving the aforesaid problem, and aims to provide an electronic musical apparatus in which a sound generable range can be changed depending upon a music piece or according to a taste of a user even if a tone is generated with a same tone color, thereby relaxing the restriction on the sound generating range after a transposition, and further aims to provide a computer program applied to the same apparatus.

In order to attain the above-mentioned object, the present invention is characterized by being provided with a performance data storing portion that stores performance data associated with each of plural music pieces and that stores tone range restriction data representing a sound generable range of a tone as associated with each piece of performance data; a transposition amount inputting portion that inputs a transposition amount; a transposing portion that changes the selected performance data, among plural pieces of performance data stored in the performance data storing portion, in accordance with the inputted transposition amount for transposing all of or a part of the music piece, which corresponds to the selected performance data, by the inputted transposition amount; and a transposition amount changing portion that, in case where a part of a pitch represented by the performance data that is changed by the transposing portion is outside the sound generable range indicated by the tone range restriction data corresponding to the changed performance data, changes the transposition amount, by the transposing portion, of all of or a part of the music piece including at least a note corresponding to the part of the pitch.

In the present invention having the aforesaid configuration, the tone range restriction data indicating the sound generable range of a tone is stored as associated with each piece of performance data. In case where a part of a pitch by the performance data that is changed by the inputted transposition amount is outside the sound generable range indicated by the tone range restriction data corresponding to the changed performance data, the transposition amount of all of or a part of the music piece, by the transposing portion, including at least a note corresponding to the part of the pitch is changed by the transposition amount changing portion. Accordingly, although the sound generating range of a tone of the music piece after the transposition is restricted, the sound generable range can be changed depending upon the music piece, even if a tone is generated with the same tone color, whereby the restriction on the sound generating range after the transposition is eased and the music piece can be automatically performed with a degree of freedom.

Another feature of the present invention is that the invention is provided with a performance data storing portion that stores plural pieces of performance data each associated with each of plural music pieces; a tone color data storing portion that stores plural pieces of tone color data for controlling a tone color of a generated tone and that rewritably stores tone range restriction data indicating a sound generable range of a tone as associated with each piece of tone color data; a transposition amount inputting portion that inputs a transposition amount; a transposing portion that changes the selected performance data, among plural pieces of performance data stored in the performance data storing portion, in accordance with the inputted transposition amount for transposing all of or a part of the music piece, which corresponds to the selected performance data, by the inputted transposition amount; and a transposition amount changing portion that, in case where a part of a pitch represented by the performance data that is changed by the transposing portion is outside the sound generable range indicated by the tone range restriction data corresponding to the tone color data that is selected among plural pieces of tone color data stored in the tone color data storing portion, changes the transposition amount, by the transposing portion, of all of or a part of the music piece including at least a note corresponding to the part of the pitch.

In the present invention having the aforesaid configuration, the tone range restriction data indicating the sound generable range of a tone is rewritably stored as associated with each piece of tone color data. In case where a part of a pitch represented by the performance data that is changed by the transposing portion is outside the sound generable range indicated by the tone range restriction data corresponding to the tone color data that is selected among plural pieces of tone color data stored in the tone color data storing portion, the transposition amount of all of or a part of the music piece, by the transposing portion, including at least a note corresponding to the part of the pitch is changed by the transposition amount changing portion. Accordingly, although the sound generating range of a tone of the music piece after the transposition is restricted, the sound generable range can be changed in accordance with a taste of a user, whereby the restriction on the sound generating range after the transposition is eased and the music piece can be automatically performed with a degree of freedom.

Upon embodying the present invention, the invention is not limited to an electronic musical apparatus. It is applicable as an invention of a computer program or a method applied to this apparatus.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

First Embodiment

Figure 1:
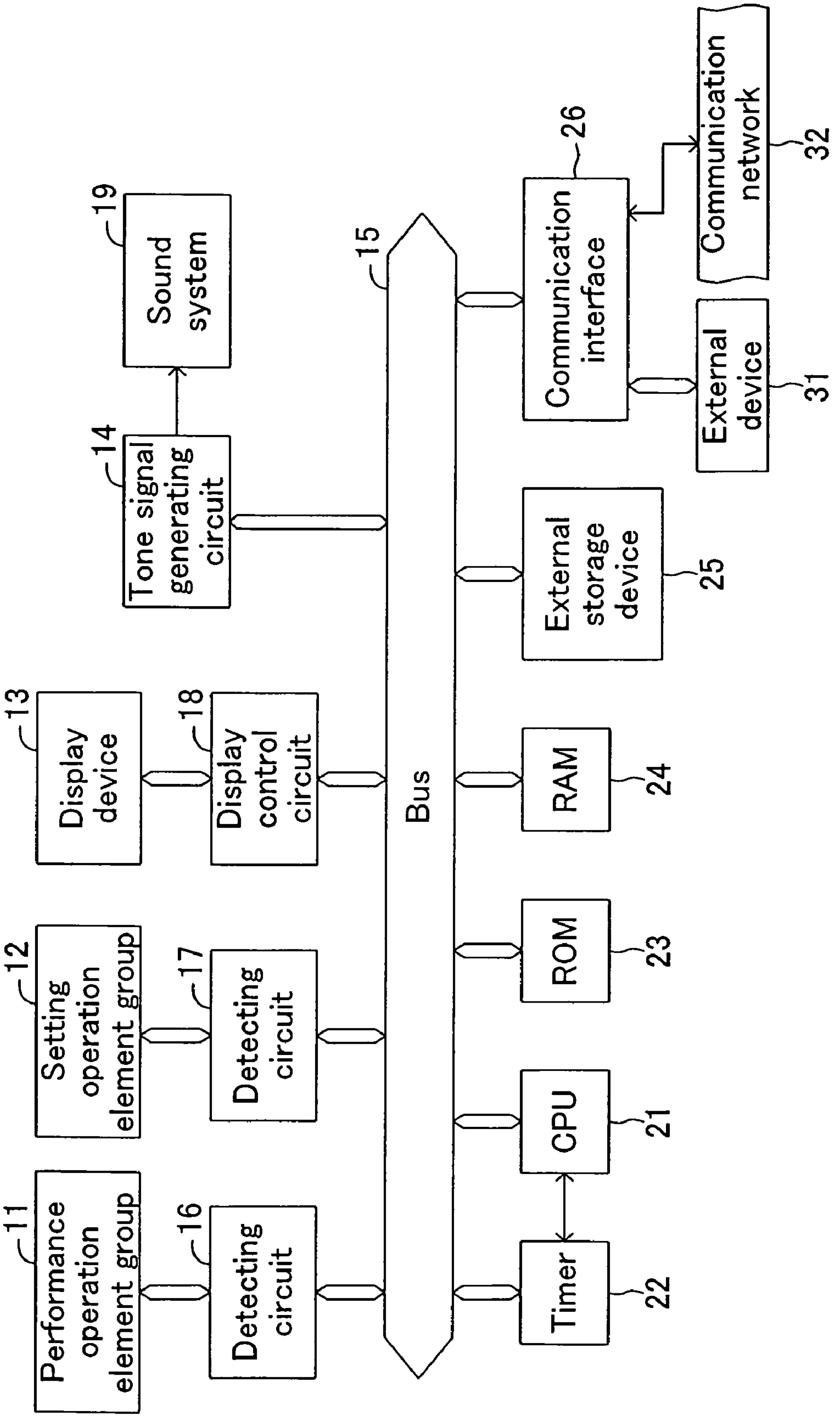
FIG. 1 is an entire block diagram of an electronic musical instrument according to first and second embodiments of the present invention.

A first embodiment of the present invention will be explained hereinafter with reference to drawings. FIG. 1 is a block diagram schematically showing an electronic musical instrument according to the first embodiment. This electronic musical instrument has a performance operation element group 11, setting operation element group 12, display device 13 and tone signal generating circuit 14.

The performance operation element group 11 is composed of plural performance operation elements (e.g., plural keys) for designating a pitch of a generated tone. The operation of each performance operation element is detected by a detecting circuit 16 connected to a bus 15. The setting operation element group 12 is composed of plural setting elements mounted at an operation panel of this electronic musical instrument for instructing an operation manner at each portion of the electronic musical instrument. The operation of each setting operation element is detected by a detecting circuit 17 connected to the bus 15. The display device 13 is composed of a liquid crystal display, CRT or the like. It displays characters, numerals, diagrams or the like. The display manner of this display device 13 is controlled by a display control circuit 18 connected to the bus 15.

The tone signal generating circuit 14, which is connected to the bus 15, forms a tone signal based upon later-described performance data and various types of tone control data supplied under the control of a CPU 21, and outputs the resultant to a sound system 19. In the tone signal generating circuit 14, a musical effect is also given to the generated tone signal under a control of the tone control data. The sound system 19 is composed of an amplifier, speakers or the like. It sounds out a tone corresponding to the tone signal.

This electronic musical instrument has the CPU 21, timer 22, ROM 23 and RAM 24, each of which is connected to the bus 15 to compose a main section of a microcomputer. The electronic musical instrument is further provided with an external storage device 25 and a communication interface circuit 26. The external storage device 25 includes a hard disk HD and flash memory installed beforehand to this electronic musical instrument, various recording mediums such as a compact disk CD, flexible disk FD or the like that can be inserted into the electronic musical instrument, and a drive unit corresponding to each recording medium. The external storage device 25 can store and read a large quantity of data and programs.

Figure 2:
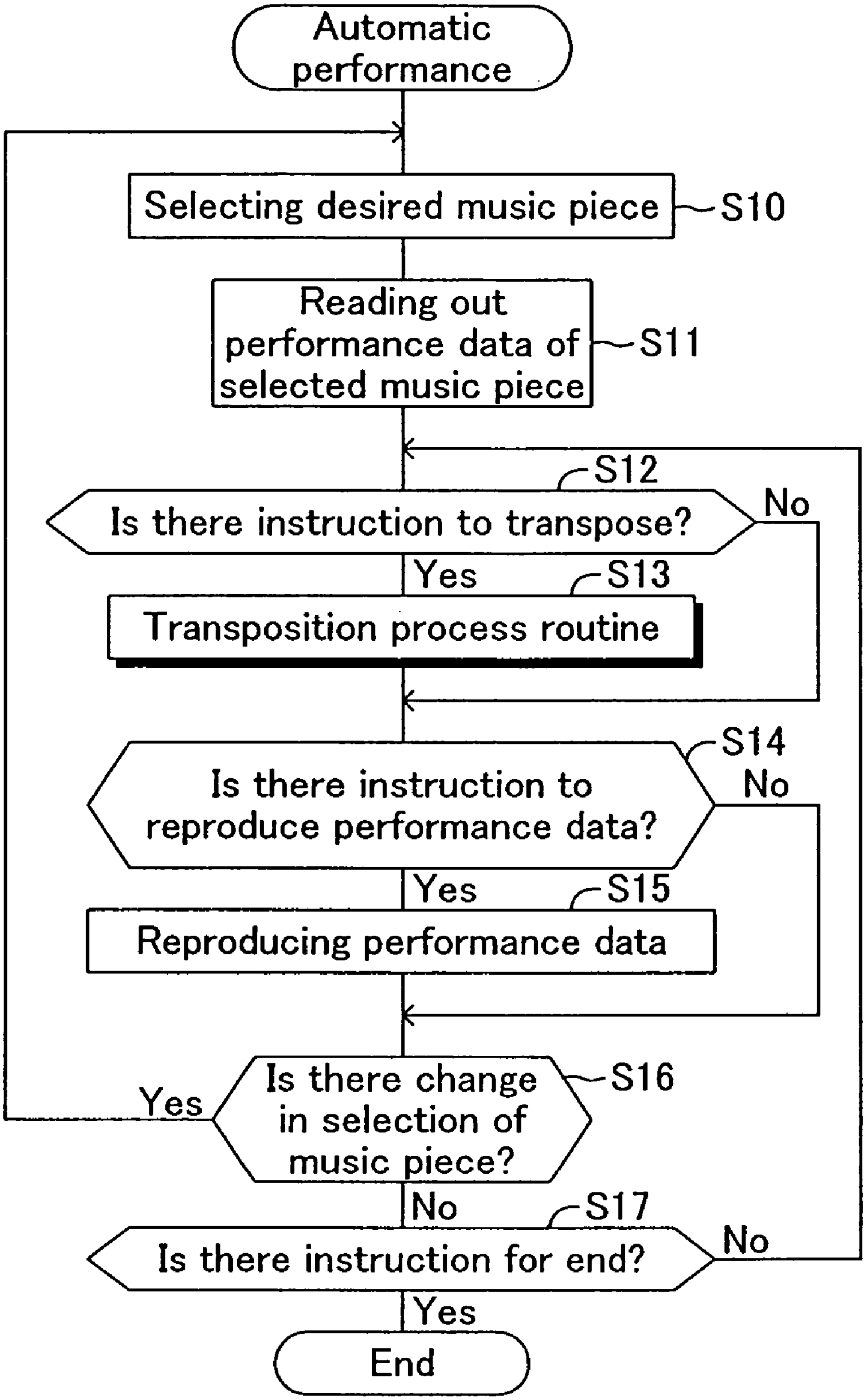
FIG. 2 is a flowchart showing an automatic performance program executed in the electronic musical instrument according to the first and second embodiments.
Figure 4:
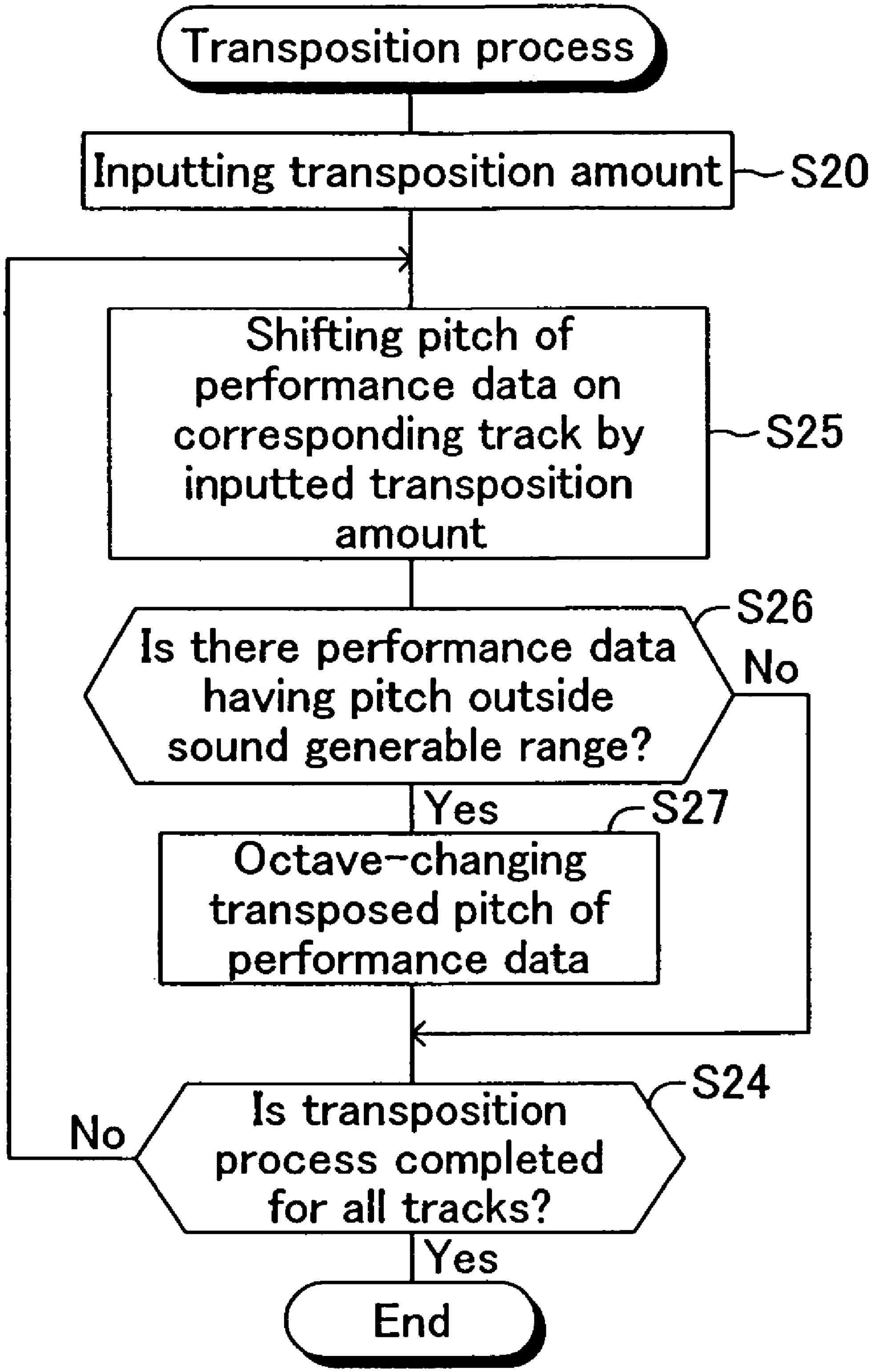
FIG. 4 is a flowchart showing another example of a transposition process routine executed in the automatic performance program.
Figure 5:
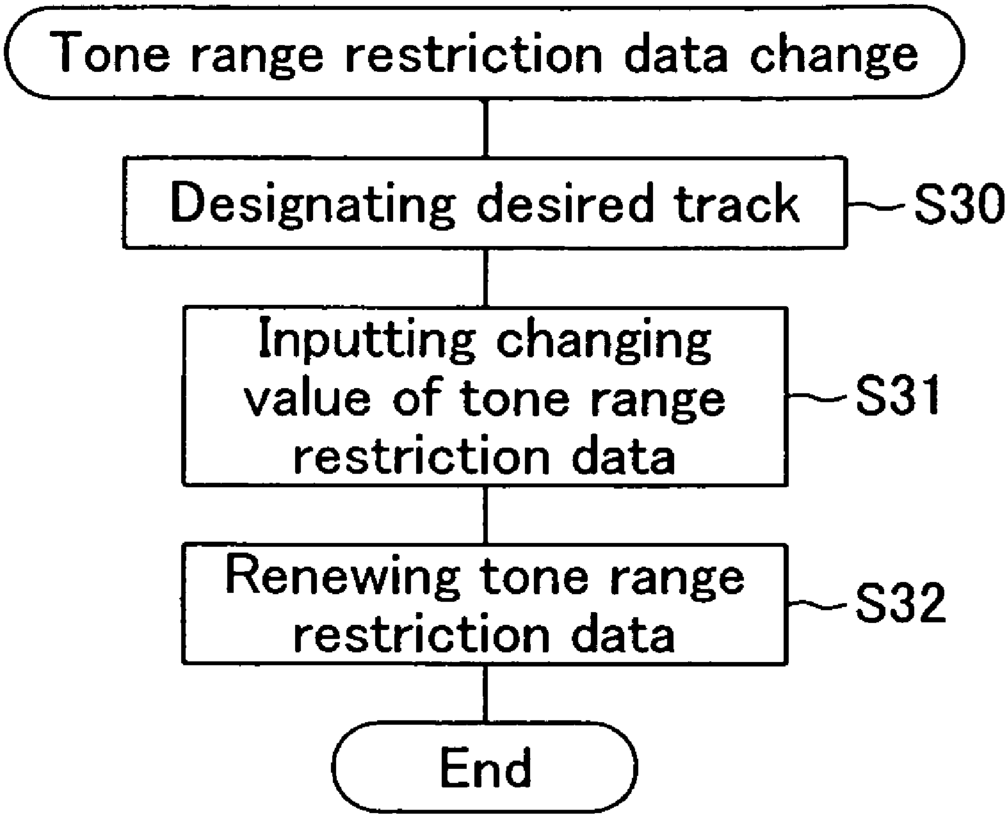
FIG. 5 is a flowchart showing a tone range restriction data changing program executed in the electronic musical instrument according to the first embodiment.

In this embodiment, in particular, automatic performance program (including a transposition process routine shown in FIG. 3 or FIG. 4) shown in FIG. 2, tone range restriction data changing program shown in FIG. 5, or the like are stored in the hard disk HD, flash memory or the like. Further, plural pieces of music piece data (performance data) each corresponding to a music piece and plural pieces of tone color data for controlling a tone color of a generated tone are stored in this hard disk HD, flash memory, or the like. The programs, music data pieces and tone color data pieces may be stored beforehand in a hard disk HD or in a flash memory, may be supplied to the hard disk HD or to the flash memory from a compact disk CD or flexible disk FD, or may be externally supplied to the hard disk HD or to the flash memory via a later-described external device 31 or communication network 32.

Figure 6:
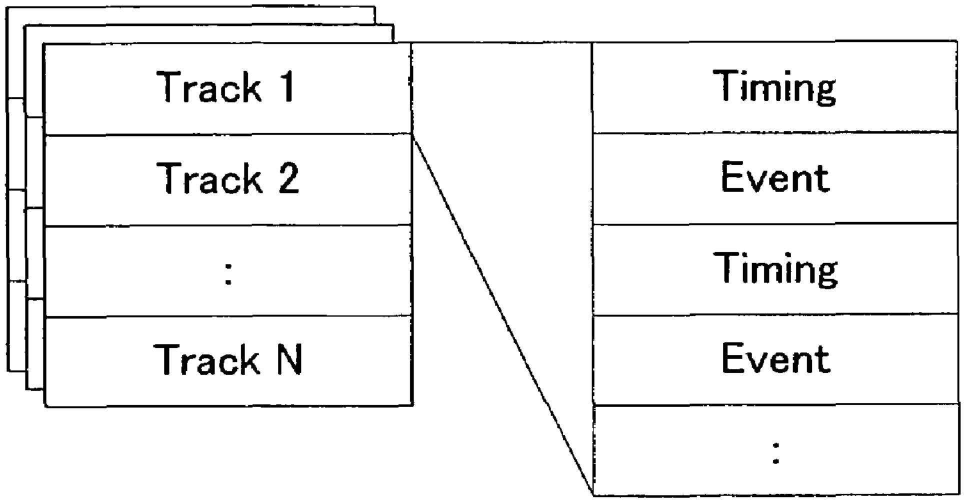
FIG. 6 is a view showing one example of a format of music data according to the first and second embodiments of the present invention.

Each piece of music data is composed of plural tracks as shown in FIG. 6. Plural pieces of event data are time-sequentially arranged to be stored in each track with timing data. The event data includes note event data, program change event data, control change event data, system exclusive data, or the like. The timing data determines an output timing of each event data. It may be data representing a relative time between adjacent event data pieces or data representing an absolute time from the start timing of each event data for a music piece.

The note event data that includes a note code (pitch data) for designating a pitch of the generated tone and instructs the pitch of the generated tone, the start of the generation of a tone, end of the generation of a tone, or the like. The program change event data designates a tone color of a generated tone. The control change event data represents an operation state of each control operation element such as a volume, modulation wheel or the like. The system exclusive data represents control information specific to a manufacturer such as specific musical instrument, specific tone generating circuit or the like.

Figure 7:
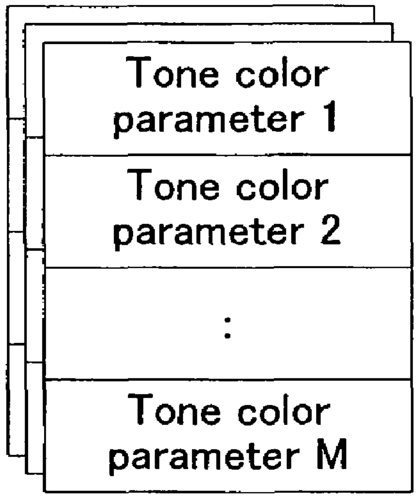
FIG. 7 is a view showing one example of a format of tone color data according to the first embodiment of the present invention.

The tone range restriction data that directly pertains to the present invention is included in all tracks or only in the track that requires a tone range restriction by using the system exclusive data, and indicates a sound generable range of a tone which is specific to the performance data composing the music data. This tone range restriction data specifies the sound generable range by both or either one of the upper-limit pitch and lower-limit pitch. The tone range restriction data may be included in a header or other dedicated control information of the performance data, instead of being included in the performance data as the event data by using the system exclusive data. Further, the tone range restriction data is writable, i.e., changeable by a user by the execution of a later-described tone range restriction data changing program. Each piece of tone color data is composed of plural tone color parameters specifying a tone color of a generated tone, as shown in FIG. 7.

The communication interface circuit 26 can be connected to the external device 31 such as other electronic musical instruments, personal computer or the like, whereby this electronic musical instrument can communicate various programs and data with the external device 31. The communication interface circuit 26 can also be connected to the outside via a communication network 32 such as the Internet, whereby this electronic musical instrument can receive or send various programs and data from or to the outside.

Subsequently, an operation of the first embodiment having the aforesaid configuration will be explained. A user operates the setting operation element group 12 to start the automatic performance program shown in FIG. 2. In this automatic performance program, the CPU 21 causes the user to select a desired music piece in cooperation with the display device 13 at Step S10. When the user selects the desired music piece, the CPU 21 reads out the music data (performance data) corresponding to the selected music piece from a hard disk HD (or from a flash memory), and writes the read data into the RAM 24. In case where the hard disk HD has no desired music piece, the desired music data is inputted from the outside via the external device 31 or communication network 32, and the inputted data is stored in the RAM 24.

After the process at Step S11, the CPU 21 executes processes at Steps S12 to S17. The processes at Steps S12 to S17 are repeatedly performed until the end of the execution of the automatic performance program is instructed by the operation on the setting operation element group 12. On the other hand, in case where the instruction is made to change the selected music piece by the operation on the setting operation element group 12 during the repeated execution of Steps S12 to S17, "YES" determination is made at Step S16, whereby the processes at Steps S10 and S11 are again executed to change the music data written in the RAM 24.

When the transposition is instructed by the operation on the setting operation element group 12 during the repeated execution of Steps S12 to S17, the CPU 21 makes "YES" determination at Step S12 so as to execute a transposition process routine at Step S13. In this transposition process routine, the CPU 21 causes the display device 13 to display the instruction for making the user designate the transposition amount at Step S20. When the user operates the operation setting element group 12 to designate the transposition amount, the CPU 21 inputs the designated transposition amount that is temporarily stored in the RAM 24. In this transposition amount, the shift amount of a pitch is designated at an interval of semitone and the up and down of the pitch are designated by a positive or negative respectively. For example, when a pitch is down by five semitones, the transposition amount becomes "−5", and when a pitch is up by seven semitones, the transposition amount becomes "+7".

Subsequently, the CPU 21 executes a circulation process composed of Steps S21 to S24 until the transposition process relating to all tracks is ended. As for the music data (performance data) written in the RAM 24, the note event data in the track that has the tone range restriction data stored therein is sequentially read out, and a transposition amount is added to the pitch data in the read note event data, at Step S21. Then, it is determined whether there is a pitch, among all pitches indicated by the pitch data to which the transposition amount has been added, that is outside the sound generable range specified by the tone range restriction data. This adding process and determining process are performed successively from the first track. In case where the tone range restriction data is not stored in the corresponding track, the CPU 21 makes "NO" determination at Step S21, and then, proceeds to Step S23 without executing the adding process and determining process.

If all pitches after the transposition belong to the sound generable range specified by the tone range restriction data at the determining process, the CPU 21 makes "NO" determination at Step S21, and then, proceeds to Step S23. In case where all pitches after the transposition at the corresponding track belong to the sound generable range specified by the tone range restriction data, including the case where the tone range restriction data is not stored in the corresponding track as described above, the inputted transposition amount is added to all pieces of pitch data in the performance data of the corresponding track at Step S23, whereby the music data written in the RAM 24 is rewritten every track.

On the other hand, in case where any one of pitches after the transposition is outside the sound generable range specified by the tone range restriction data, the CPU 21 makes "YES" determination at Step S21, and proceeds to Step S23 after executing a process for changing the transposition amount by an octave at Step S22. In the process for changing the transposition amount by an octave, the transposition amount for lowering the pitch of the music piece is changed to a transposition amount for raising the pitch after the transposition by one octave, i.e., changed to a value obtained by adding "+12" to the inputted transposition amount. For example, the transposition amount of "−5" is changed to "+7". Further, the transposition amount for raising the pitch of the music piece is changed to a transposition amount for lowering the pitch after the transposition by one octave, i.e., changed to a value obtained by subtracting "+12" from the inputted transposition amount. For example, the transposition amount of "+7" is changed to "−5".

As described above, in case where any one of pitches in the corresponding track after the transposition is outside the sound generable range specified by the tone range restriction data, any one of following first to third pitch shift processes is executed using the octave-shifted transposition amount with respect to the performance data of the corresponding track at Step S23, whereby the music data written in the RAM 24 is rewritten every track. The first pitch shift process is to add the octave-shifted transposition amount to all pieces of pitch data in the performance data of the corresponding track. The second pitch shift process is to add the octave-shifted transposition amount to only the pitch data that is determined to have a pitch after the transposition outside the sound generable range, among all pieces of performance data of the corresponding track, and to add the inputted transposition amount to the other pitch data. The third pitch shift process is to add the octave-shifted transposition amount to only the pitch data in the performance data within a predetermined range (for example, within a range of the same phrase) to which the pitch data, that is determined to have a pitch after the transposition outside the sound generable range, belongs, and to add the inputted transposition amount to the pitch data in the performance data that does not belong to the aforesaid range. When the processes at Steps S21 to S24 are executed to all tracks, "YES" determination is made at Step S24 so as to end the execution of this transposition process routine.

Figure 3:
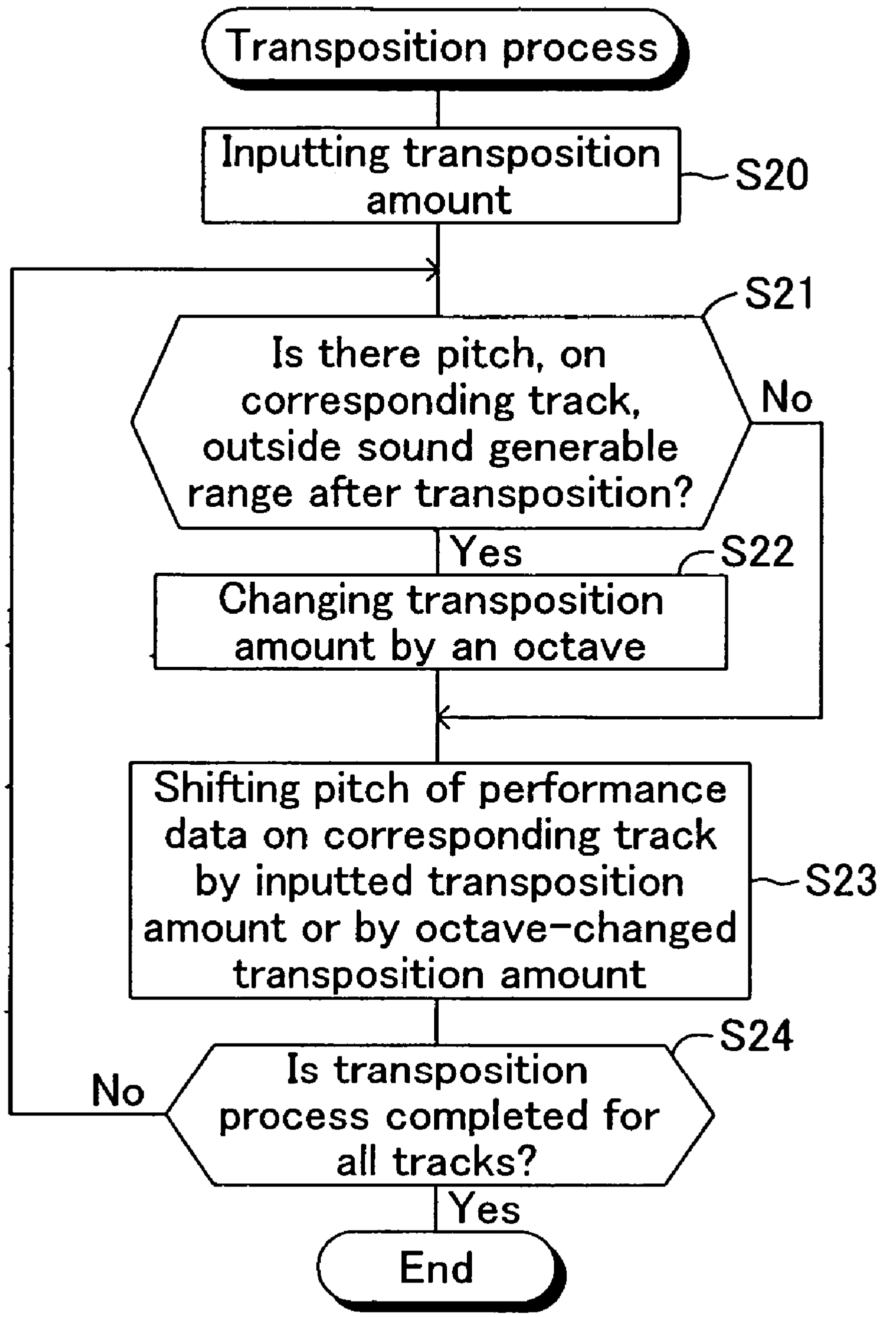
FIG. 3 is a flowchart showing one example of a transposition process routine executed in the automatic performance program.

Instead of the transposition process routine shown in FIG. 3, a transposition process routine shown in FIG. 4 may be executed. This transposition routine in FIG. 4 has processes at Steps S25 to S27 instead of processes at Steps S21 to S23 in FIG. 3. The processes at Steps S20 and S24 in FIG. 4 marked with the same numerals as FIG. 3 are the same as those in FIG. 3. At Step S25, the transposition amount inputted by the process at Step S20 is added to all pieces of pitch data in the performance data of the corresponding track, whereby the music data (performance data) written in the RAM 24 is rewritten for every track. Then, it is determined at Step S26 whether there is pitch data that is outside the sound generable range specified by the tone range restriction data included in the performance data, among all pieces of pitch data in the rewritten performance data of the corresponding track.

In this case too, "NO" determination is made at Step S26 as to the track not including the tone range restriction data and track in which all pitches indicated by the performance data rewritten by the process at Step S25 in the RAM 24 are within the sound generable range specified by the tone range restriction data. The performance data of these tracks are kept to be the performance data rewritten by the process at Step S25 and transferred to the process for the performance data of the next track. On the other hand, "YES" determination is made at Step S26 as to a track in which any one of all pitches indicated by the performance data rewritten by the process at Step S25 in the RAM 24 is outside the sound generable range specified by the tone range restriction data, whereby the octave changing process at Step S27 is performed.

In this octave changing process, the performance data in the RAM 24 that is rewritten by the process at Step S25 is checked one by one for determining whether a pitch indicated by the pitch data in the performance data is outside the sound generable range specified by the tone range restriction data. If there is pitch data whose pitch is outside the sound generable range, the performance data in the RAM 24 relating to the pitch outside the sound generable range is octave-shifted so as to be rewritten into the performance data indicating a pitch within the sound generable range. In this case too, any one of the following first to third pitch shift processes is adopted so that all pitches indicated by the pitch data belong to the sound generable range, in order to obtain the result same as that of any one of the foregoing first to third pitch shift processes. The first pitch shift process is to shift all pieces of pitch data in the performance data at the corresponding track by one octave toward a high-pitch side or low-pitch side that is opposite to the transposition. The second pitch shift process is to shift only the pitch data, which is determined to have a pitch outside the sound generable range after the transposition, among all pieces of performance data at the corresponding track, by one octave toward a high-pitch side or low-pitch side that is opposite to the transposition. The third pitch shift process is to shift only the pitch data in the performance data within a predetermined range (for example, within a range of the same phrase) to which the pitch data, which is determined to have a pitch outside the sound generable range after the transposition among all pieces of performance data at the corresponding track belongs, by one octave toward a high-pitch side or low-pitch side that is opposite to the transposition.

Figure 8C:
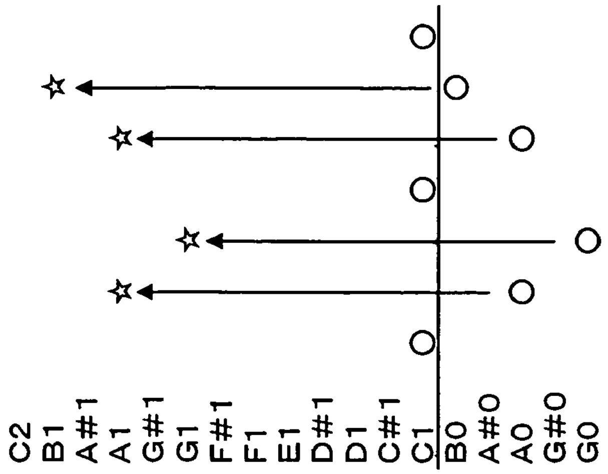
FIGS. 8A to 8C are explanatory views for explaining an octave-shift of a pitch after the transposition, in case where tone range designating information is used as the tone range restriction data.
Figure 8B:
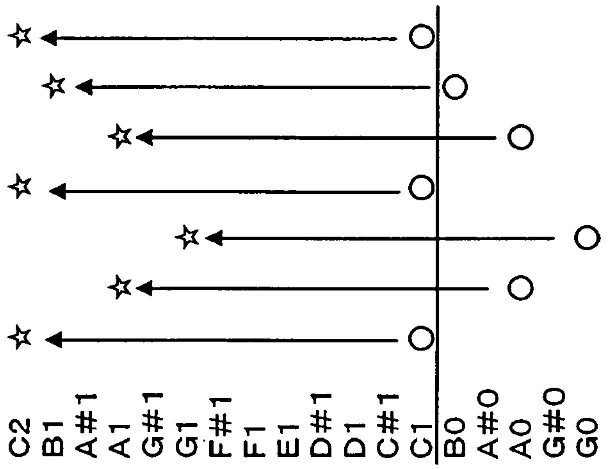
Figure 8A:
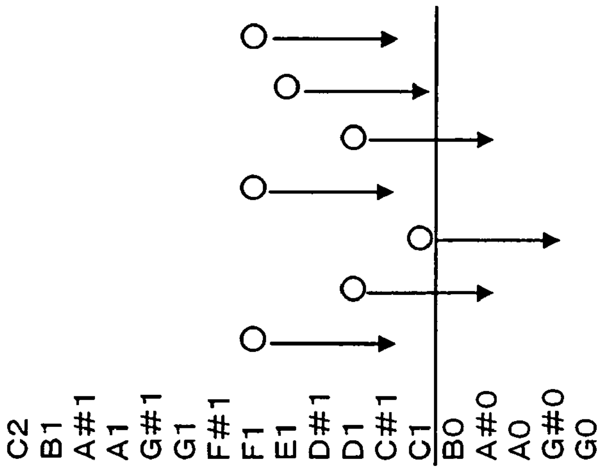

The transposition process shown in FIG. 3 or FIG. 4 will be explained with reference to the drawings. FIGS. 8A to 8C illustrate the case where the lower limit of the sound generable range is specified as a pitch C1 by tone range designating information, and the transposition amount is "−5", i.e., a pitch is lowered by five semitones. In this case, the pitches marked with circles in FIG. 8A are lowered by five semitones, these pitches become those marked with circles in FIGS. 8B and 8C. Supposing that there exits at least one pitch that is outside the sound generable range in the pitches after the transposition. In case where it is selected that all pitches or all pitches in the predetermined range are octave-shifted (corresponding to the first and third pitch shift processes in FIG. 3 and FIG. 4), all pitches indicated by circles are changed to pitches indicated by stars as shown in FIG. 8B. On the other hand, in case where it is selected that only the pitch outside the sound generable range in the pitches after the transposition is octave-shifted (corresponding to the second pitch shift process in FIG. 3 and FIG. 4), only pitches outside the sound generable range indicated by circles are changed to pitches indicated by stars as shown in FIG. 8C.

Returning again to the explanation of the automatic performance data shown in FIG. 2, when the reproduction of the music data (performance data) is instructed by the setting operation element group 12, the CPU 21 makes "YES" determination at Step S14, and executes the reproduction process of the music data at Step S15. In this reproduction process of the music data, the performance data in the RAM 24 is successively read out in accordance with the progression of the music piece, whereupon the read performance data is successively outputted to the tone signal generating circuit 14. This makes it possible to sound out a tone corresponding to the performance data in the RAM 24 from the sound system 19, whereby the music piece corresponding to the performance data is automatically performed. In this case, if the transposition is instructed to the selected music data, the music data in the RAM 24 that is subject to the transposition process by the process at Step S13 is reproduced.

The tone color of the tone generated in this manner is generally designated by the program change event data in the performance data. Specifically, when the program change event data is read out, plural tone color parameters (see FIG. 7) composing the tone color data designated by the program change event data are read out and supplied to the tone signal generating circuit 14, whereby the tone signal having the tone color corresponding to the program change event data is generated at the tone signal generating circuit 14. It is to be noted that a user can designate the tone color of the generated tone by the operation on the setting operation element group 12, instead of the tone color by the program change event data in the performance data.

The music piece corresponding to the music data is optionally transposed and reproduced by the instruction from the user to transpose the music piece and to reproduce the music data by the execution of the automatic performance program including the transposition process routine. This is convenient to play a musical instrument or sing a song to this reproduced music. Further, since the sound generable range of the generated tone is restricted by the tone range restriction data in this transposition, unnatural transposition cannot be performed. Moreover, this tone range restriction data is independently included in the performance data corresponding to each music piece, so that, although the sound generating range of the tone of the music piece after the transposition is restricted, the sound generable range can be changed depending upon a music piece even if a tone is generated with the same tone color. Therefore, the restriction of the sound generating range after the transposition is eased, with the result that an automatic performance of a music piece can be performed with a degree of freedom.

A user can change the tone range restriction data included in the performance data. In this case, the user operates the setting operation element group 14 to start the tone range restriction data changing program shown in FIG. 5. In this tone range restriction data changing program, the CPU 21 causes the user to designate a desired track in the music data written in the RAM 24 in cooperation with the display device 13 at Step S30. Not only one track but also plural tracks can be designated in the designation of the track. When the user designates a desired track, the CPU 21 inputs the designated track at Step S30.

Subsequently, the CPU 21 displays on the display device 13 an instruction for causing the user to designate the changing value of the tone range restriction data at Step S31. When the user operates the setting operation element group 12 to designate the changing value of the tone range restriction data, the CPU 21 inputs the designated changing value of the tone range restriction data. Upon inputting the changing value of the tone range restriction data, the tone range may be designated by a note name or numerical value (note code) such as "E0-C5". Alternately, a figure of a performance operation element such as a keyboard or musical score is displayed on the display device 13, wherein the tone range or pitch may be designated on this display. After the process at Step S31, the tone range restriction data in the designated track is renewed to the inputted changing value. It is also possible to rewrite the music data previously stored in the external storage device 25 such as a hard disk HD or flash memory to the music data including the renewed tone range restriction data.

If the music data in the RAM 24 is reproduced by the execution of the above-described automatic performance program after renewing the tone range restriction data, the sound generable range is specified by the renewed tone range restriction data, although the sound generating range of a tone after the transposition of the music piece is restricted. Accordingly, the sound generable range of the reproduced music piece is changed according to a taste of a user by the execution of the tone range restriction data changing program. Therefore, the restriction of the sound generating range after the transposition is eased, with the result that an automatic performance of a music piece can be performed with a degree of freedom.

Second Embodiment

Subsequently, a second embodiment of the present invention will be explained. An electronic musical instrument according to this second embodiment is configured in the same manner as that shown in FIG. 1. The external storage device 25 such as a hard disk HD or flash memory stores an automatic performance program (including the transposition process routine shown in FIG. 3 or FIG. 4) shown in FIG. 2 that is the same as that in the first embodiment. Further, the external storage device 25 stores the tone range restriction data changing program shown in FIG. 9. Moreover, The external storage device 25 such as a hard disk HD or flash memory stores plural pieces of music data (performance data) and tone color data, but the tone range restriction data is not stored in the music data according to the second embodiment. The tone range restriction data is stored as associated with each tone color data as shown in FIG. 10. Accordingly, a pitch after the transposition is specified by the tone range restriction data for every tone color of the generated tone in the second embodiment. In this case too, the tone range restriction data may be included in all pieces of tone color data, or included only in the tone color data that requires the tone range restriction. Further, the tone range restriction data can be rewritten, i.e., can be changed, by a user by the execution of the later-described tone range restriction data changing program.

In the second embodiment having the aforesaid configuration, a desired music piece is transposed and reproduced by the execution of the automatic performance program shown in FIG. 2, like the first embodiment. However, the tone range restriction data used for determining whether a pitch is outside the sound generable range or not at Step S21 in FIG. 3 and Step S26 in FIG. 4 is the tone range restriction data included in the tone color data that specifies a tone color of a generated tone. The tone color data specifying a tone color of a generated tone is changed over by the program change event data in the performance data with the lapse of time, or selected by the operation on the setting operation element group 12, as described above.

Figure 9:
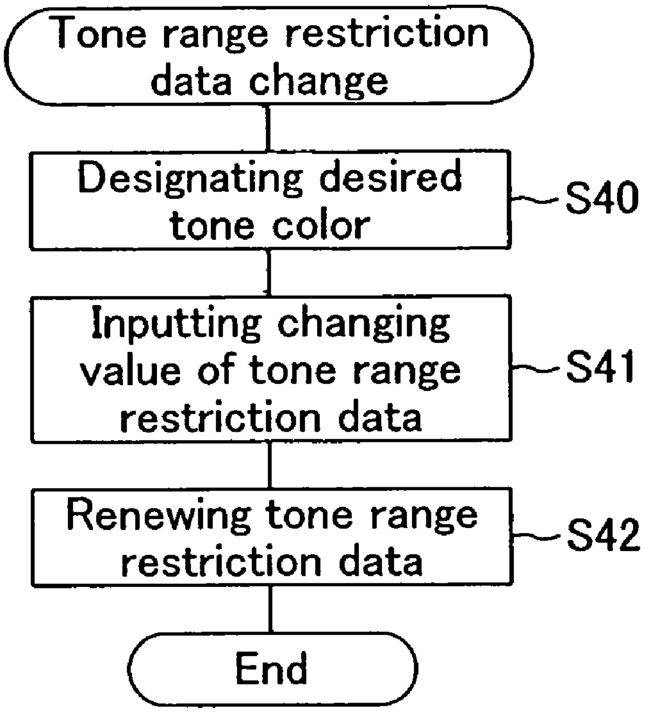
FIG. 9 is a flowchart showing the tone range restriction data changing program executed in the electronic musical instrument according to the second embodiment of the invention.
Figure 10:
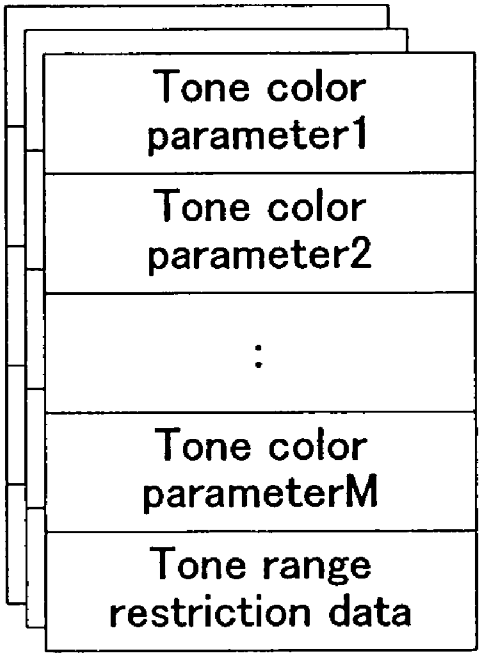
FIG. 10 is a view showing one example of a format of tone color data according to the second embodiment of the present invention.

Further, in this second embodiment, the tone range restriction data included in the tone color data can be changed by the execution of the tone range restriction data changing program shown in FIG. 9. When the tone range restriction data changing program shown in FIG. 9 is started by the operation on the setting operation element group 14 by a user, the CPU 21 causes the user to designate a desired tone color in cooperation with the display device 13 at Step S40 in this tone range restriction data changing program. Not only one tone color but also plural tone colors can be designated in the designation of a tone color. When the user designates a desired tone color, the CPU 21 inputs the tone color designated at Step S40. Then, at Step S41, the CPU 21 inputs the changing value of the tone range restriction data by the same manner as the process at Step S31 in the first embodiment. The CPU 21 then renews the tone range restriction data in the tone color data corresponding to the designated tone color to the inputted changing value at Step S42. It is also possible to rewrite the tone color data previously stored in the external storage device 25 such as a hard disk HD or flash memory to the tone color data including the renewed tone range restriction data.

If the music data (performance data) in the RAM 24 is reproduced by the execution of the above-described automatic performance program after renewing the tone range restriction data, the sound generable range is specified by the renewed tone range restriction data, although the sound generating range of a tone after the transposition of the music piece is restricted, in this second embodiment. Accordingly, the sound generable range of the reproduced music piece is changed according to a taste of a user by the execution of the tone range restriction data changing program. Therefore, the restriction of the sound generating range after the transposition is eased, with the result that an automatic performance of a music piece can be performed with a degree of freedom.

In the second embodiment, after the tone range restriction data is included in the tone color data, the tone range restriction data can also be included in the music data like the first embodiment. In case where the tone range restriction data is included in both the music data and tone color data as described above, it may be determined beforehand which tone range restriction data has priority for every electronic musical instrument, or a user may select either tone range restriction data.

OTHER MODIFIED EXAMPLES

Upon embodying the present invention, the invention is not limited to the first and second embodiments and their modified examples, but various modifications are possible without departing from the spirit of the present invention.

For example, the first and second embodiments adopt the tone range designating information, which specifies one of or both of the upper-limit pitch and lower-limit pitch of the sound generable range, as the tone range restriction data. However, instead of this or in addition to this, low interval limit information can be adopted, in case where plural tones each having a different pitch such as a chord are simultaneously generated. The low interval limit information is previously stored in a table in the external storage device 25. Each piece of low interval limit information has absolute pitch data and interval data for specifying a pitch that inhibits tone generation. A tone represented by absolute pitch data is inhibited from generating when another tone, which has an interval represented by interval data from the tone represented by the absolute pitch data, is generated. For example, in case where absolute pitch data represents pitch A2 and interval data represents five semitone intervals (perfect fourth) or three semitone intervals (minor third), tone generation of pitch A2 is inhibited if a tone of pitch D3 or C3 is generated. In case where absolute pitch data represents pitch G2 and interval data represents four semitone intervals (major third), tone generation of pitch G2 is inhibited if a tone of pitch B2 is generated. This low limit interval information is to avoid beat tone generated between two tones in case where a difference in frequency between two tones simultaneously generated at low tone pitch is small. In case where the tone range designating information and low interval limit information are both included as the tone range restriction data, the tone generation is inhibited by at least either one piece of information. Further, the user may select the tone range designating information or low interval limit information.

Figure 11A:
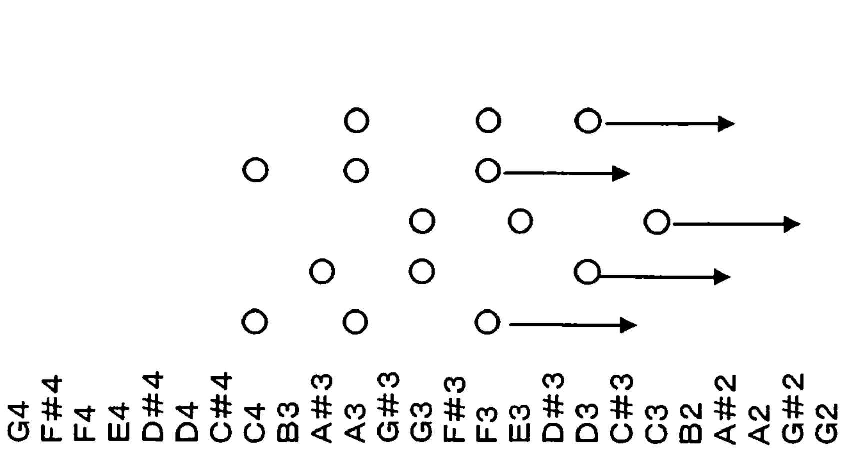
FIGS. 11A to 11C are explanatory views for explaining an octave-shift of a pitch after the transposition, in case where low interval limit information is used as the tone range restriction data.
Figure 11B:
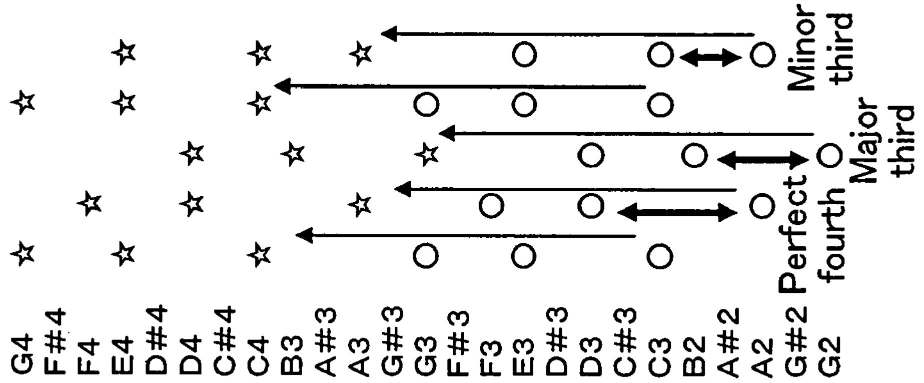
Figure 11C:
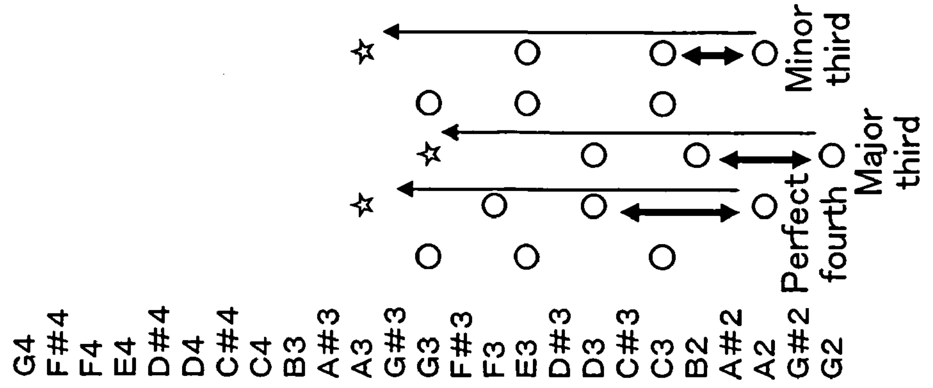

FIGS. 11A to 11C illustrate an example adopting low interval limit information as the tone range restriction data for specifying the sound ungenerable range or sound generable range. This example shows that pitch A2 and five semitone intervals (perfect fourth), pitch A2 and three semitone intervals (minor third), and pitch G2 and four semitone intervals (major third) are specified respectively. In this case, when the pitches marked with circles in FIG. 11A are lowered by five semitones, these pitches become those marked with circles in FIGS. 11B and 11C. Supposing that there exits at least one pitch that is outside the sound generable range in the pitches of plural tones that are simultaneously generated after the transposition. In case where it is selected by a user that all tones that are simultaneously generated are octave-shifted, all pitches indicated by circles are changed to pitches indicated by stars as shown in FIG. 11B. On the other hand, in case where it is selected by a user that only the pitches outside the sound generable range in the pitches of plural tones simultaneously generated after the transposition are octave-shifted, only pitches outside the sound generable range indicated by circles are changed to pitches indicated by stars as shown in FIG. 11C.

In the former case where all tones simultaneously generated are octave-shifted, all pieces of pitch data in the performance data at the corresponding track, a pair of pitch data that is determined to have a pitch outside the sound generable range after the transposition and is simultaneously reproduced, among all pieces of performance data at the corresponding track, or all pieces of pitch data in the performance data within the predetermined range (e.g., within a range of the same phrase) to which the pitch data having a pitch determined to be outside the sound generable range after the transposition belongs, are octave-shifted by any one of the first to third pitch shift processes, like the first and second embodiments. Further, the tone range restriction data adopting the low interval limit information can also be rewritten, i.e., can also be changed, by the execution of the tone range restriction data changing program shown in FIG. 5 and FIG. 9 by a user.

The tone range restriction data in the music data is directly rewritten in the first embodiment, or the tone range restriction data in the tone color data is directly rewritten in the second embodiment. However, the invention is not limited thereto. The tone range restriction data designated by a user and associated with the music data and tone color data may be stored so as to be separately rewritable, while keeping intact the tone range restriction data in the music data or tone color data. The storage area in the tone range restriction data may be in the music data or in the tone color data that can be changed by a user, or may be the one other than these areas managed by a system.

In case where there is tone range restriction data, the restriction process of the tone range is always executed in the first and second embodiments and their modified examples. However, instead of this, whether the restriction process of the tone range is executed or not may be selected by a user, even if there is tone range restriction data.

Further, the present invention is applied to an electronic musical instrument using a key as a performance operation element in the first and second embodiments and their modified examples. However, the present invention may be applied to an electronic musical instrument using a performance operation element for designating a pitch, such as a simple pressing switch or touch switch, instead of a key. Further, the present invention can be applied to other electronic music apparatus capable of reproducing music data other than the electronic musical instrument, such as karaoke apparatus, automatic performance apparatus, music amusement apparatus, personal computer, or the like.

What is claimed is:

1. An electronic musical apparatus comprising:

a performance data storing portion that stores performance data associated with each of plural music pieces and that stores tone range restriction data representing a sound generable range of a tone as associated with each piece of performance data;

a transposition amount inputting portion that inputs a transposition amount;

a transposing portion that changes the selected performance data, among plural pieces of performance data stored in the performance data storing portion, in accordance with the inputted transposition amount for transposing all of or a part of the music piece, which corresponds to the selected performance data, by the inputted transposition amount; and a transposition amount changing portion that, in case where a part of a pitch represented by the performance data that is changed by the transposing portion is outside the sound generable range indicated by the tone range restriction data corresponding to the changed performance data, changes the transposition amount, by the transposing portion, of all of or a part of the music piece including at least a note corresponding to the part of the pitch.

2. An electronic musical apparatus according to claim 1, wherein the performance data is composed of plural tracks, and the tone range restriction data is included in all or a part of the plural tracks.

3. An electronic musical apparatus according to claim 1, wherein the tone range restriction data specifies the sound generable range by both or either one of the upper-limit pitch and lower-limit pitch.

4. An electronic musical apparatus according to claim 1, wherein the tone range restriction data is low interval limit information for specifying a pitch that inhibits tone generation in case where plural tones are simultaneously generated.

5. An electronic musical apparatus according to claim 1, wherein the tone range restriction data is changeable.

6. An electronic musical apparatus according to claim 1, wherein the transposition amount changing portion selectively changes the transposition amount in accordance with user instruction.

7. An electronic musical apparatus according to claim 1, wherein the transposition amount changing portion changes the transposition amount before the transposing portion changes the selected performance data.

8. An electronic musical apparatus according to claim 1, wherein the transposition amount changing portion changes the changed performance data after the transposing portion changes the selected performance data.

9. An electronic musical apparatus according to claim 1, wherein the transposition amount changing portion changes the transposition amount to all of the selected performance data.

10. An electronic musical apparatus according to claim 1, wherein the transposition amount changing portion changes the transposition amount to only performance data that is determined to have a pitch after the transposition outside the sound generable range.

11. An electronic musical apparatus according to claim 1, wherein the transposition amount changing portion changes the transposition amount to only performance data within a predetermined range to which the performance data belongs, the performance data being determined to have a pitch after the transposition outside the sound generable range.

12. An electronic musical apparatus comprising:

a performance data storing portion that stores plural pieces of performance data each associated with each of plural music pieces;

a tone color data storing portion that stores plural pieces of tone color data for controlling a tone color of a generated tone and that rewritably stores tone range restriction data indicating a sound generable range of a tone as associated with each piece of tone color data;

a transposition amount inputting portion that inputs a transposition amount;

a transposing portion that changes the selected performance data, among plural pieces of performance data stored in the performance data storing portion, in accordance with the inputted transposition amount for transposing all of or a part of the music piece, which corresponds to the selected performance data, by the inputted transposition amount; and a transposition amount changing portion that, in case where a part of a pitch represented by the performance data that is changed by the transposing portion is outside the sound generable range indicated by the tone range restriction data corresponding to the tone color data that is selected among plural pieces of tone color data stored in the tone color data storing portion, changes the transposition amount, by the transposing portion, of all of or a part of the music piece including at least a note corresponding to the part of the pitch.

13. An electronic musical apparatus according to claim 12, wherein the tone range restriction data is included in all or a part of the tone color data.

14. An electronic musical apparatus according to claim 12, wherein the tone range restriction data specifies the sound generable range by both or either one of the upper-limit pitch and lower-limit pitch.

15. An electronic musical apparatus according to claim 12, wherein the tone range restriction data is low interval limit information for specifying a pitch that inhibits tone generation in case where plural tones are simultaneously generated.

16. An electronic musical apparatus according to claim 12, wherein the transposition amount changing portion selectively changes the transposition amount in accordance with user instruction.

17. An electronic musical apparatus according to claim 12, wherein the transposition amount changing portion changes the transposition amount before the transposing portion changes the selected performance data.

18. An electronic musical apparatus according to claim 12, wherein the transposition amount changing portion changes the changed performance data after the transposing portion changes the selected performance data.

19. An electronic musical apparatus according to claim 12, wherein the transposition amount changing portion changes the transposition amount to all of the selected performance data.

20. An electronic musical apparatus according to claim 12, wherein the transposition amount changing portion changes the transposition amount to only performance data that is determined to have a pitch after the transposition outside the sound generable range.

21. An electronic musical apparatus according to claim 12, wherein the transposition amount changing portion changes the transposition amount to only performance data within a predetermined range to which the performance data belongs, the performance data being determined to have a pitch after the transposition outside the sound generable range.

22. A computer-readable medium storing a computer program for an electronic musical apparatus having a performance data storing portion that stores plural pieces of performance data each associated with each of plural music pieces, the computer program comprising:

a transposition amount inputting instruction for inputting a transposition amount;

a transposing instruction for changing the selected performance data, among plural pieces of performance data stored in the performance data storing portion, in accordance with the inputted transposition amount for transposing all of or a part of the music piece, which corresponds to the selected performance data, by the inputted transposition amount; and a transposition amount changing instruction for, in case where a part of a pitch represented by the performance data that is changed by the transposing instruction is outside the sound generable range indicated by the tone range restriction data corresponding to the changed performance data, changing the transposition amount, by the transposing instruction, of all of or a part of the music piece including at least a note corresponding to the part of the pitch.

23. A computer-readable medium storing a computer program for an electronic musical apparatus having a performance data storing portion that stores plural pieces of performance data each associated with each of plural music pieces, and a tone color data storing portion that stores plural pieces of tone color data for controlling a tone color of a generated tone and that rewritably stores tone range restriction data indicating a sound generable range of a tone as associated with each piece of tone color data, the computer program comprising:

a transposition amount inputting instruction for inputting a transposition amount;

a transposing step for changing the selected performance data, among plural pieces of performance data stored in the performance data storing portion, in accordance with the inputted transposition amount for transposing all of or a part of the music piece, which corresponds to the selected performance data, by the inputted transposition amount; and a transposition amount changing instruction for, in case where a part of a pitch represented by the performance data that is changed by the transposing instruction is outside the sound generable range indicated by the tone range restriction data corresponding to the tone color data that is selected among plural pieces of tone color data stored in the tone color data storing portion, changing the transposition amount, by the transposing instruction, of all of or a part of the music piece including at least a note corresponding to the part of the pitch.

* * * * *